Aug. 16, 1955  W. A. BEDFORD, JR  2,715,350
SHEET METAL NUT WITH RELEASING
AND ENGAGEMENT LIMITING MEANS
Filed Aug. 18, 1953
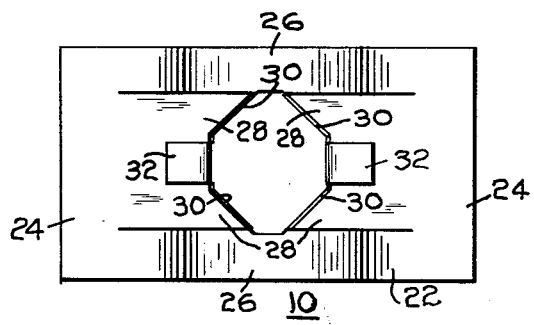
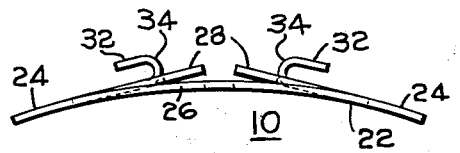
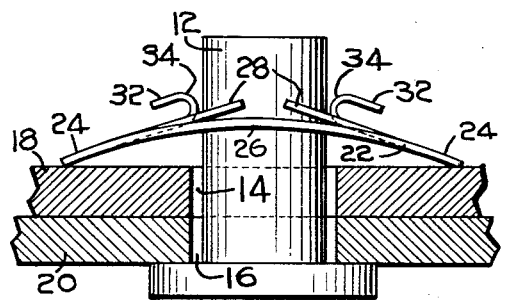
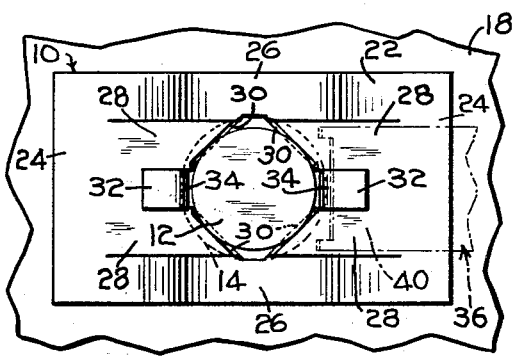
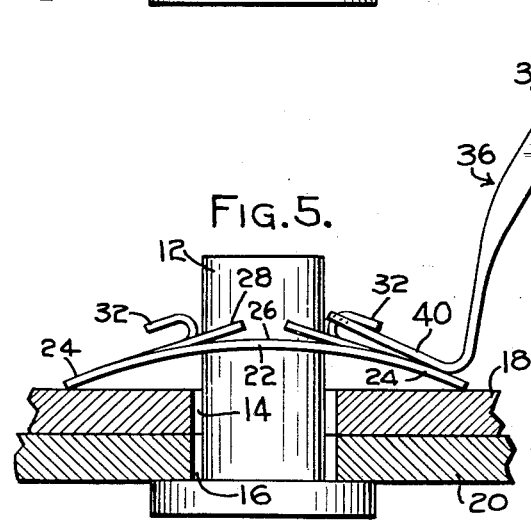
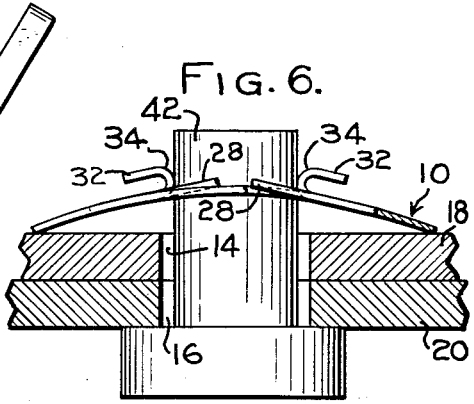
INVENTOR:
WILLIAM A. BEDFORD JR.,
BY Robert E Ross
ATTORNEY.

United States Patent Office 2,715,350
Patented Aug. 16, 1955

2,715,350
SHEET METAL NUT WITH RELEASING AND ENGAGEMENT LIMITING MEANS

William A. Bedford, Jr., North Scituate, Mass., assignor, by mesne assignments, to United-Carr Fastener Corporation, Boston, Mass., a corporation of Delaware Application August 18, 1953, Serial No. 374,966

2 Claims. (Cl. 85—36)

This invention relates generally to fastening devices and has particular reference to a sheet metal nut for assembly onto an unthreaded stud.

Sheet metal nuts, having tongues inclined upwardly about a stud-receiving opening in a base, are used in many applications where speed of assembly is important. However, such nuts have been found to have a number of disadvantages. When assembled onto a stud formed of plastic or the like, the tongues frequently dig into the plastic so far that they no longer have sufficient spring tension to cause the base to bear against the support.

The digging of the tongues into the stud also makes it extremely difficult to remove the fastener. This is also the case when the fastener is used on a metal stud, since the tongues, which are formed of carbon steel, will dig into a stud of soft steel or die cast metal. The difficulty of removing the fastener is troublesome both on the assembly line, when a defective part must be replaced, and in subsequent repair operations.

The object of this invention is to provide a sheet metal nut which eliminates the above difficulties so that it is readily removable from a stud on which it is assembled and is provided with means for limiting the extent to which it can dig into engagement with a plastic stud.

Other objects of the invention will, in part, be obvious, and will, in part, appear hereinafter.

In the drawing:

Fig. 1 is a top plan view of a sheet metal nut embodying the features of the invention;

Fig. 2 is a view in side elevation of the nut of Fig. 1;

Fig. 3 is a view in side elevation of the nut of Figs. 1 and 2 assembled onto a metal stud;

Fig. 4 is a top plan view of the assembly of Fig. 3;

Fig. 5 is a view similar to Fig. 3 illustrating the method of removing the fastener from the stud; and Fig. 6 is a view in side elevation of the fastener of Figs. 1 and 2 assembled onto a stud formed of plastic.

Referring to the drawing, there is illustrated a sheet metal nut 10, which is adapted for assembly onto a stud 12 protruding through aligned openings 14 and 16 in superimposed panels 18 and 20.

The nut 10 is formed of a single piece of carbon steel, and comprises generally a base portion 22 having end portions 24 connected by straps 26, and a pair of stud-engaging arms 28. The arms 28 are each joined to an end portion 24 and extend therefrom generally toward each other, terminating in free ends which are spaced apart a predetermined distance to receive a stud therebetween. The free ends each comprise a pair of biting edges 30 disposed angularly in relation to each other at the ends of the arms, and a medial tongue portion 32, which is bent back on the arm to extend an appreciable distance toward the adjacent end of the fastener substantially parallel to the arm and in spaced relation thereto. The reverse bend in the tongue 32 provides a rounded nose portion 34 disposed between and spaced upwardly from the biting edges on the end of each arm.

In the assembly of Figs. 3 and 4 the fastener is shown assembled onto a metal stud, which may be either die casting metal, low carbon steel, or other material which is relatively soft in relation to the high carbon steel of which the fastener is formed. The fastener is assembled by simply pushing it onto the stud, so that the arms 28 flex upwardly to permit the stud to pass between the ends thereof and the base becomes arched downwardly with the ends thereof seating against the panel 18 (see Fig. 3). The biting edges 30 dig into the surface of the stud, thereby retaining the base in the arched condition and retaining the stud in secure engagement in the opening.

After such assembly, the fastener may be easily removed by the use of a tool 36, as illustrated in Fig. 5. The tool 36 comprises a handle portion 38, and a lever portion 40 extending at substantially a right angle thereto. The end of the lever portion is placed under the tongue 32 of one of the arms, and with the junction of the lever portion and the handle portion resting on one of the end portions of the fastener, the handle is moved outwardly, thereby prying the arm upwardly. If a lifting force is applied to the tool at the same time, the fastener readily moves upwardly off the stud.

The fastener is also particularly adapted for use on plastic studs. In Fig. 6, the fastener 10 is shown assembled onto a stud 42 formed of plastic. Due to the relative softness of plastic, the biting edges of the fastener arms will dig more deeply into the stud than is the case with a metal stud. However, the rounded nose 34 between the biting edges bears against the stud and limits the distance said edges can dig into the stud, and thereby insures that the spring tension of the arched base will be maintained, and also permits the removal of the fastener from the stud with the tool 36 as hereinbefore described.

Although in the illustrated embodiment the fastener is assembled onto smooth studs, it will be apparent that the fastener may be assembled onto threaded or knurled studs with equally good results.

Since certain obvious modifications may be made in the device without departing from the scope of the invention, it is intended that all matter contained herein be interpreted in an illustrative and not in a limiting sense.

I claim:

1. A sheet metal nut for assembly onto a stud, comprising a base having a central opening, a pair of resilient arms disposed on the base and extending generally toward each other to receive the stud therebetween, said arms each having biting edges at the ends for engagement with a stud, said biting edges on each arm being disposed angularly in relation to each other to form a medial notch in the end of the arm, and a tongue member formed on the end of each arm between the biting edges, said tongue member being curled back on the arm to provide a rounded nose portion disposed between the biting edges and terminating in a free end portion extending away from the end of the arm substantially parallel to the arm and in spaced relation thereto.

2. A sheet metal nut for assembly onto a stud, comprising a base having a central opening a pair of resilient arms disposed on the base and extending generally toward each other to receive the stud therebetween said arms each having biting edges at the ends for engagement with a stud, said biting edges on at least one of said arms having portions disposed angularly in relation to each other to form a medial notch in the end of the arm, and a tongue member formed on the end of said one arm between the edge portions said tongue member being curled back on the arm to provide a rounded nose portion disposed between the bitng edges and terminating in a free end portion extending away from the end of the arm substantially parallel to the arm and in spaced relation thereto.

References Cited in the file of this patent

UNITED STATES PATENTS

| | | |
|---|---|---|
| 1,793,127 | Osius | Feb. 17, 1931 |
| 1,971,881 | Tinnerman | Aug. 28, 1934 |
| 2,181,631 | Tinnerman | Nov. 28, 1939 |
| 2,230,916 | Tinnerman | Feb. 4, 1941 |